T. B. OGLESBY.
Teeth for Cotton-Gin Saws.

No. 138,575

Patented May 6, 1873.

Witnesses:

Inventor:
T. B. Oglesby
PER Munn & Co.
Attorneys.

UNITED STATES PATENT OFFICE.

THOMAS B. OGLESBY, OF HEMPSTEAD, TEXAS.

IMPROVEMENT IN TEETH FOR COTTON-GIN SAWS.

Specification forming part of Letters Patent No. 138,575, dated May 6, 1873; application filed August 13, 1870.

*To all whom it may concern:*

Be it known that I, THOMAS B. OGLESBY, of Hempstead, in the county of Austin and State of Texas, have invented a new and useful Improvement in Cotton-Gin Saws; and I do hereby declare that the following is a full, clear, and exact description thereof, which will enable others skilled in the art to make and use the same, reference being had to the accompanying drawing forming part of this specification.

This invention relates to improvements in cotton-gin saws; and consists in an improvement in the dress or shape of the teeth, whereby I am enabled to produce better results in ginning cotton, as hereinafter described.

Figure 1:
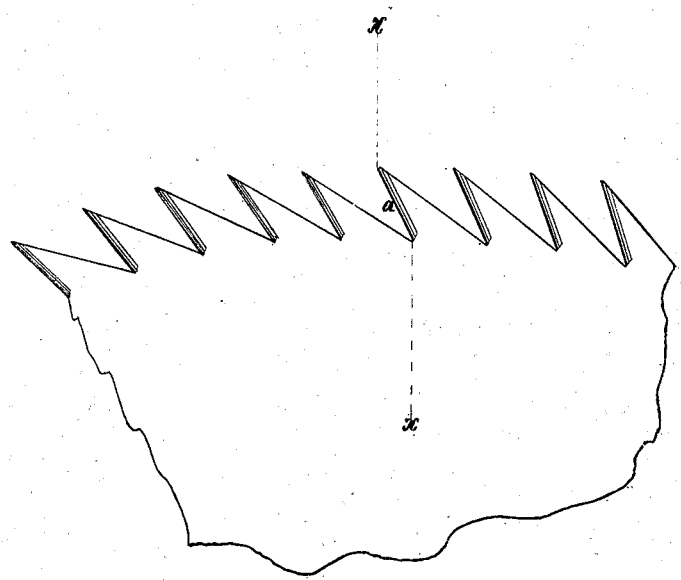
Figure 2:
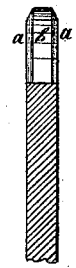

Figure 1 is a side elevation of a part of a saw having my improved dress; and Fig. 2 is a section of the same on the line $x\ x$.

Similar letters of reference indicate corresponding parts.

My improvement consists in shaping the teeth flat across the front $b$, and beveling the corners at $a$, as shown, and making them flat across the rear faces, both the said flat parts being perpendicular to the sides of the saw-plate. This shape I denominate the flat dress, and it differs in this respect from the common "briar"-shaped dress, in which the teeth are gradually reduced from the angular-shaped base to a briar-shaped point.

My improved dress is much simpler and easier to make, and has several advantages besides, which I have found by practical demonstration, some of which may be stated, as follows: First, the saws gin much faster; second, they clean the seed much cleaner, gaining fully one bale in twenty; third, the saws do not "nap" the cotton, for the reason that the teeth are more perfectly cleaned by the brush; fourth, they do not cut the hulls in pieces like the saws with the old dress, therefore making a much cleaner sample; and, fifth, cotton ginned with this dress is worth from one-half to one cent more per pound than the cotton ginned by saws having the old dress.

Having thus described my invention, I claim as new, and desire to secure by Letters Patent—

A tooth for cotton-gin saws, having the front beveled on the sides $a\ a$, and flattened on the center $b$, as and for the purpose specified.

THOMAS B. OGLESBY.

Witnesses:
R. P. FADDIS,
J. B. AHRENBECK,
JNO. BROOK, Jr.